Jan. 10, 1956  W. H. DU BOIS  2,730,202
FLUID SEAL FOR BRAKE

Filed March 17, 1950  3 Sheets-Sheet 1

INVENTOR.
WILLIAM H. DuBois
BY
T. J. Plante
ATTORNEY

Jan. 10, 1956　　　W. H. DU BOIS　　　2,730,202
FLUID SEAL FOR BRAKE
Filed March 17, 1950　　　　　　　　　　3 Sheets-Sheet 2

INVENTOR.
WILLIAM H. DuBOIS
BY
T. J. Plante
ATTORNEY

United States Patent Office 2,730,202
Patented Jan. 10, 1956

2,730,202
FLUID SEAL FOR BRAKE

William H. Du Bois, South Bend, Ind., assignor to Bendix Aviation Corporation, South Bend, Ind., a corporation of Delaware Application March 17, 1950, Serial No. 150,177

8 Claims. (Cl. 188—152)

This invention relates to brakes which are so constructed and arranged as to be particularly adapted for use with aircraft landing gear. Specifically, the present application discloses a disk brake actuator which is an improved form of the "incomplete annulus" actuator shown and claimed in Du Bois and Chapin Patent No. 2,483,362.

Patent No. 2,483,362 relates to a hydraulically actuated disk brake in which the piston has the form of an incomplete annulus, allowing the lower end of the landing gear strut to occupy space which would normally be utilized by the brake actuator. In the construction disclosed in the patent, the end portions of the actuator terminate in enlarged cylindrical "bulbs," which are provided primarily for the purpose of retaining in position the sealing member which rests against the face of the piston. In other words, the "bulb" portions on the ends of the sealing member help to hold it in place, and the piston has to be provided with similar "bulb" portions to match those of the sealing member.

In general, the object of the present invention is to provide an improved version of the disk brake of Patent No. 2,483,362. More specifically, the present brake arrangement is intended to retain the advantages of the arrangement disclosed in the patent, and at the same time provide the following additional advantages: (*a*) reduction of the manufacturing cost of the brake; and (*b*) greater sealing efficiency of the sealing member mounted on the piston. These advantages, I have found, can be obtained by eliminating the bulb-shaped end portions of the incomplete annulus (which serves as the brake actuator), and retaining the sealing member in position on the face of the actuator by means of one or more pins having their heads embedded in the sealing member and their stems extending into openings in the piston.

Other objects and advantages of the present invention will become apparent during the following description. In the accompanying drawings:

Figure 1 is an elevational view of a brake associated with an aircraft landing gear, a portion of the structure being cut away to show the brake actuator;

Figures 2 and 3 are sectional views taken on the lines 2—2 and 3—3, respectively, of Figure 1;

Figure 1:
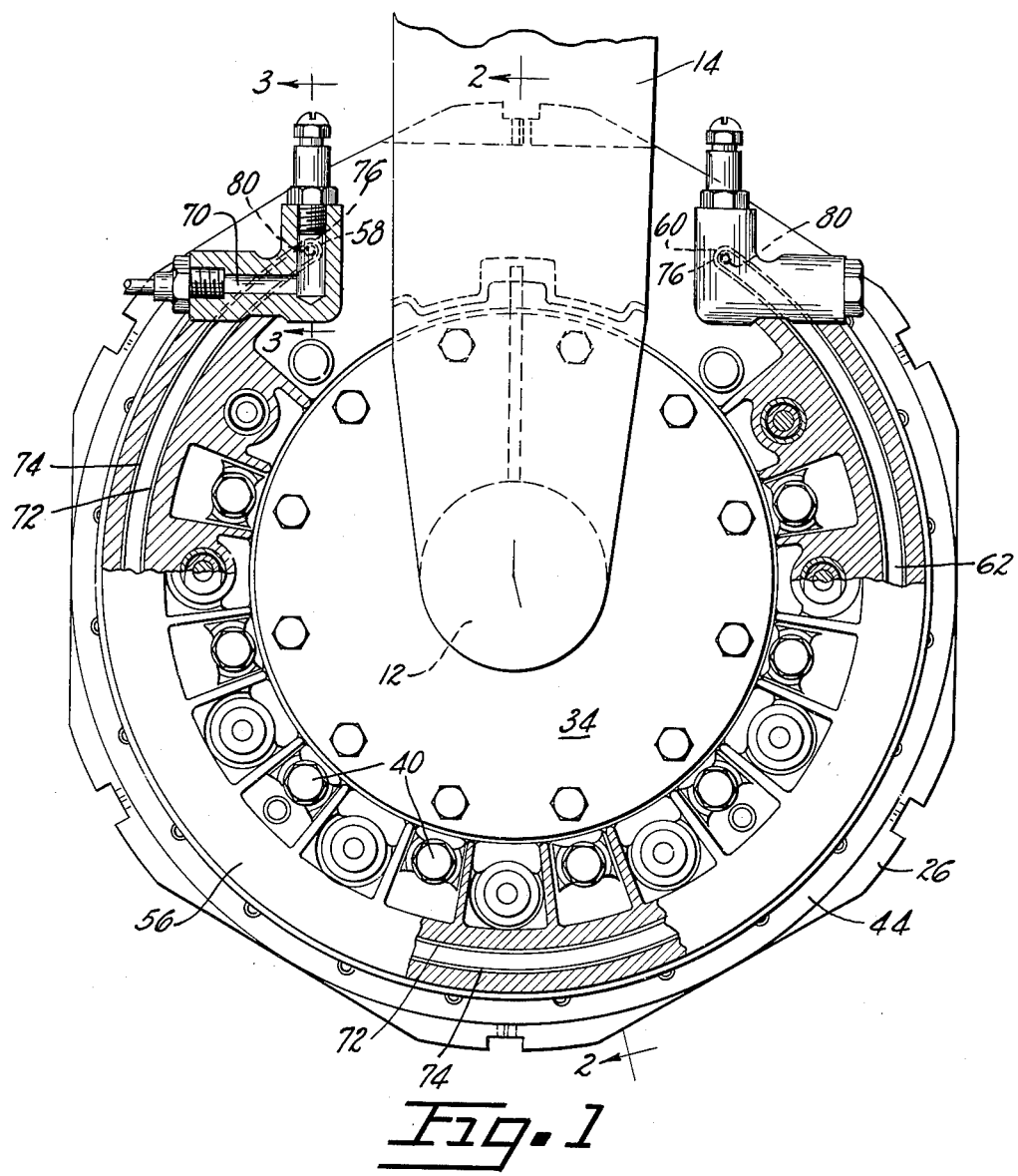
Figure 2:
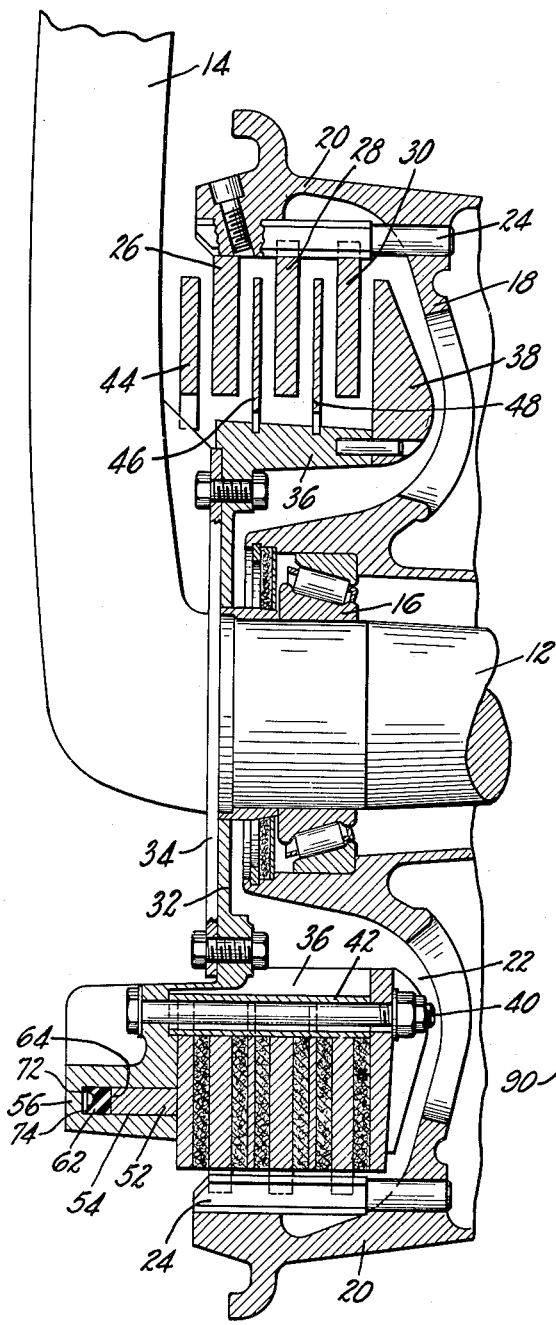
Figure 3:
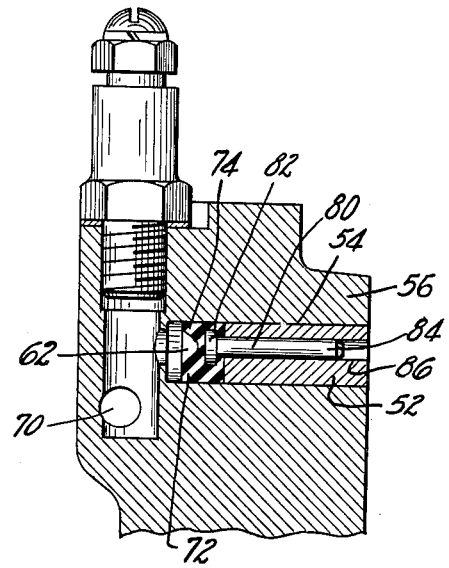

Referring to the construction shown in Figures 1 to 3, a cantilever axle 12 is supported at the lower end of strut 14. Mounted on bearings 16 for rotation about axle 12 is a wheel 18 having an overhanging rim portion 20, beneath which is a brake cavity 22. A plurality of driving keys 24 are secured to the wheel within the overhanging rim portion 20. The keys 24 extend axially through peripheral slots in the rotating disks 26, 28, and 30 to drive the disks as the wheel rotates, while permitting them to move axially into engagement with the cooperating nonrotating disk members of the brake structure.

The number of rotating and nonrotating disks may, of course, be varied in accordance with the requirements of the particular brake installation.

The nonrotating disk members of the brake are supported on a fixed member 32, which is secured to a flange 34 on the lower end of strut 14. Member 32 has a plurality of axially extending spacers 36, against the outer ends of which a nonrotatable and axially fixed disk 38 is held by means of a plurality of through bolts 40. Sleeves 42 are mounted on the bolts 40 and serve as anchors for three axially movable but nonrotatable disks 44, 46, and 48. Both sides of disks 46 and 48 are lined with friction material, as well as the left face of disk 38 and the right face of disk 44 (as seen in Figure 2).

The brake actuator comprises a plunger, or piston, member 52 which is movable axially within a chamber 54 provided in a fixed housing 56, which, in the illustrated embodiment of the invention, is formed integral with the brake supporting member 32. Because a relatively small space is available for the brake structure between the strut 14 and the wheel 18, the rotating and nonrotating friction disks fill substantially the entire brake cavity. The housing 56, in which the pressure-transmitting piston 52 is mounted, is therefore located in the vertical plane of the strut 14 and is discontinued between the points 58 and 60 (see Figure 1), in order to provide an opening through which the strut extends.

The chamber 54 and the pressure-transmitting piston member 52 have the form of an incomplete annulus, i. e., an arcuate member which extends through less than the full circle of the disk brake assembly. The radial dimension of piston 52 is the same throughout its arcuate extent; in other words, the spacing between the inner circumference and the outer circumference of the piston is uniform throughout its length. At the points 58 and 60, the piston terminates in semicircular end portions which are formed on radii equal to half the radial dimension of the piston, the end portions of the piston being rounded off without radial enlargement. Manufacturing the piston 54 of the present brake assembly is easier and less costly than manufacturing the piston disclosed in Patent No. 2,483,362. An important reduction in expense is that permitted by simplification of the machining operation.

The function of sealing the liquid in the left end of chamber 54 (see Figures 2 and 3) is accomplished by a rubber sealing member 62, which rests against the face 64 of piston 52. The sealing member 62, like piston 52, has the form of an incomplete annulus, and is provided with an inner lip 72, an outer lip 74, and a semicircular lip 76 at each end portion, each lip 76 joining the inner lip 72 to the outer lip 74 to form, in effect, a single, continuous lip along the entire sealing surface of chamber 54.

Suitable means must be provided for holding the sealing member 62 in position on the face of piston 52. The problem is particularly severe because of the length and radial thinness of the sealing member. My solution of the problem consists in utilizing a plurality of pins 80 having head portions 82 embedded in the base of the rubber sealing member and stem portions 84 extending into openings 86 provided in piston 52. The pins are made from any suitable rigid material which will enable them to be easily inserted into openings 86. As shown in Figure 1, two of the pins 80 are used, one being located at each end of the sealing member. The heads of the pins are molded into the sealing member, and the stems of the pins are made sufficiently long to avoid cocking. The guided pins 80 overcome any tendency of the sealing member 62 to shorten its arcuate dimension through shrinkage.

In operation, fluid under pressure is admitted through one of the inlets 70 (two inlets preferably being provided so that identical brakes can be used on the left and right wheels). The pressure fluid acts against sealing member 62 and piston 52 to force them toward the right, bringing the several brake disks into engagement to retard rotation of the wheel. After the brake applying pressure has been released, disk 44 and piston 52 are returned to released position by suitable return springs.

Figure 5:
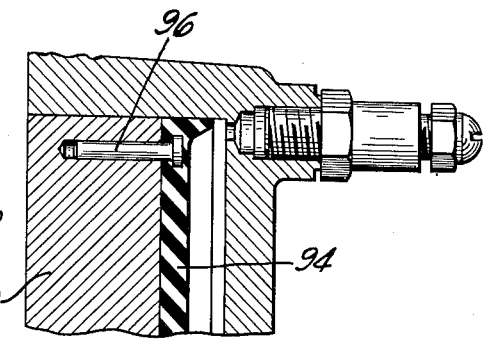
Figure 5 is a sectional view taken on the line 5—5 of Figure 4.
Figure 4:
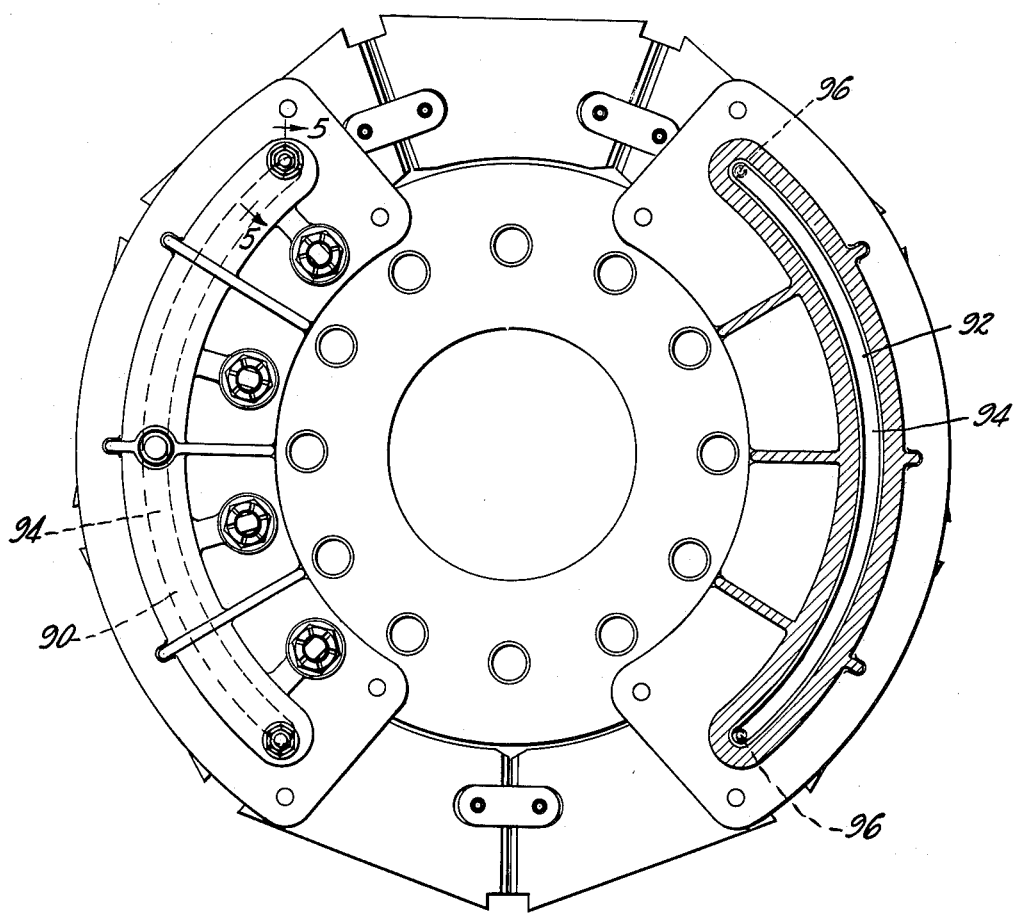
Figure 4 is an elevational view of a modified version of the invention.

The disk brake assembly shown in Figures 4 and 5 has two arcuate actuating pistons 90 and 92, each of which is an incomplete annulus extending through less than half of the brake circle. This arrangement not only leaves room for the strut at the top of the brake, but also provides space for a jack, which can be brought into engagement with the underside of the axle, in order to lift the wheel off the ground. Each of the pistons 90 and 92 has a rubber sealing member 94, which is held in position by a pair of retaining pins 96 located near opposite ends of the seal. In all, four retaining pins are needed to hold in place the two sealing members of the brake.

Although certain specific embodiments of the invention have been illustrated and described, various changes in the form and relative arrangement of the parts may be made to suit requirements.

I claim:

1. In a disk brake of the type having a plurality of rotatable and non-rotatable friction members which are brought into engagement by relative axial movement, an axially movable pressure-transmitting member adapted to force said friction members into engagement with one another, a chamber in which said pressure-transmitting member reciprocates, said pressure-transmitting member and the chamber in which it reciprocates having the form of an incomplete annulus which has a uniform radial dimension throughout its arcuate extent and which terminates in semi-circular end portons formed on radii equal to half of said radial dimension, a sealing member located in the chamber and mounted on the face of the pressure-transmitting member to prevent the escape of fluid from the chamber, said sealing member being shaped to conform to the chamber and having a continuous lip extending along the outer wall of the chamber, along the semi-circular end portions of the chamber, and along the inner wall of the chamber, and two retaining pins, one located near each end of the incomplete annulus, and each having a head portion molded into the sealing member and an axially-extending rigid stem formed to slide into and out of a hole in the pressure-transmitting member, each stem being such as to insure abutment between the ends of said sealing member and said semi-circular end portions.

2. In a disk brake of the type having a plurality of rotatable and non-rotatable friction members which are brought into engagement by relative axial movement, an axially movable pressure-transmitting member adapted to force said friction members into engagement with one another, a chamber in which said pressure-transmitting member reciprocates, said pressure-transmitting member and the chamber in which it reciprocates having the form of an incomplete annulus which has a uniform radial dimension throughout its arcuate extent and which terminates in semi-circular end portions formed on radii equal to half of said radial dimension, a sealing member mounted on the face of the pressure-transmitting member to prevent the escape of fluid from the chamber, said sealing member being shaped to conform to the chamber and having a continuous lip extending along the outer wall of the chamber, along the semi-circular end portions of the chamber, and along the inner wall of the chamber, and a plurality of retaining pins located near each end of said incomplete annulus, each pin having a head portion molded into the sealing member and an axially-extending rigid stem formed to slide into and out of a hole in the pressure-transmitting member, said pins insuring sealing engagement of said sealing member with the ends of said chamber.

3. A disk brake actuator comprising an axially movable pressure-transmitting member, a chamber in which said pressure-transmitting member reciprocates, the chamber having an opening to receive fluid under pressure to act on the pressure-transmitting member, said pressure-transmitting member and the chamber in which it reciprocates having the form of an incomplete annulus which has a uniform radial dimension throughout its arcuate extent and which terminates in semi-circular end portions formed on radii equal to half of said radial dimension, a sealing member mounted on the face of the pressure-transmitting member to prevent the escape of fluid from the chamber, said sealing member being shaped to conform to the chamber and having a continuous lip extending along the outer wall of the chamber, along the semi-circular end portions of the chamber, and along the inner wall of the chamber, and a plurality of retaining pins, each of said pins having a head portion molded into the sealing member and an axially-extending rigid stem formed to slide into and out of a hole in the pressure-transmitting member, said pins being so arranged as to maintain the ends of said sealing member in engagement with the ends of said chamber.

4. A disk brake actuator comprising an axially movable pressure-transmitting member, a chamber in which said pressure-transmitting member reciprocates, the chamber having an opening to receive fluid under pressure to act on the pressure-transmitting member, said pressure-transmitting member and the chamber in which it reciprocates having the form of an incomplete annulus which has a uniform radial dimension throughout its arcuate extent and which terminates in semi-circular end portions formed on radii equal to half of said radial dimension, a sealing member mounted on the face of the pressure-transmitting member to prevent the escape of fluid from the chamber, said sealing member being shaped to conform to the chamber and having a continuous inner and outer wall-engaging lip, and a plurality of retaining pins, each having a head portion molded into the sealing member and an axially-extending stem formed to slide into and out of a hole in the pressure-transmitting member, said pins serving to maintain the ends of said sealing member in sealing engagement with the ends of said chamber.

5. A disk brake actuator comprising an axially movable pressure-transmitting member, a chamber in which said pressure-transmitting member reciprocates, said pressure-transmitting member and the chamber in which it reciprocates having the form of an incomplete annulus which has a uniform radial dimension throughout its arcuate extent and which terminates in semi-circular end portions formed on radii equal to half of said radial dimension, a sealing member mounted on the face of the pressure-transmitting member to prevent the escape of fluid from the chamber, said sealing member being shaped to conform to the chamber and having a continuous wall-engaging lip, and a plurality of retaining pins at the end portions only of said sealing member, each of said pins having a head portion molded into the sealing member and an axially-extending stem formed to slide into and out of a hole in the pressure-transmitting member, said stem being so arranged as to maintain the sealing member in sealing engagement with the entire arcuate extent of said chamber.

6. A disk brake actuator comprising an axially movable pressure-transmitting member, a chamber in which said pressure-transmitting member reciprocates, said pressure-transmitting member and the chamber in which it reciprocates having the form of an incomplete annulus which has a uniform radial dimension throughout its arcuate extent and which terminates in semi-circular end portions formed on radii equal to half of said radial dimension, a sealing member which prevents the escape of fluid from the chamber, said sealing member being shaped to conform to the chamber, and a plurality of retaining pins, each of said pins having a head portion molded into the opposite ends of the sealing member and an axially-extending stem formed to slide into and out of a hole in the pressure-transmitting member.

7. A disk brake actuator comprising an axially movable pressure-transmitting member, a chamber in which said pressure-transmitting member reciprocates, said pressure-transmitting member and the chamber in which it reciprocates having the form of an incomplete annulus which has a uniform radial dimension throughout its arcuate extent and which terminates in semi-circular end portions formed on radii equal to half of said radial dimension, a sealing member which prevents the escape of fluid from the chamber, said sealing member being shaped to conform to the chamber, and retaining pins having head portions molded into the extreme ends of said sealing member and a stem formed to slide into and out of an opening in the pressure-transmitting member.

8. A disk brake actuating means comprising a fluid pressure-transmitting member adapted to force one or more non-rotatable brake elements into frictional engagement with one or more rotatable brake elements, a chamber in which said pressure-transmitting member can reciprocate, said pressure-transmitting member and the chamber in which it reciprocates having the shape of an incomplete annulus which has a uniform radial width throughout its arcuate extent and which terminates in end portions having a radial width no greater than the radial width of said annulus, a sealing member mounted on the face of the pressure-transmitting member to prevent the escape of fluid from the chamber, said seal being shaped to conform to the chamber, and a retaining pin located near each end of the incomplete annulus to hold the sealing member in abutment with the ends of said chamber, each pin having a head portion molded into the sealing member and a rigid stem formed to slide into and out of a hole in the pressure-transmitting member.

References Cited in the file of this patent

UNITED STATES PATENTS

| | | |
|---|---|---|
| 2,106,592 | Dick | Jan. 25, 1938 |
| 2,261,962 | Christenson | Nov. 11, 1941 |
| 2,315,944 | Dick | Apr. 6, 1943 |
| 2,483,362 | Du Bois et al. | Sept. 27, 1949 |